United States Patent [19]

Andrews et al.

[11] Patent Number: 5,572,695
[45] Date of Patent: Nov. 5, 1996

[54] TRANSPARENT MEMORY MAPPING MECHANISM FOR A DIGITAL SIGNAL PROCESSING SYSTEM

[75] Inventors: Lawrence P. Andrews, Boca Raton; Derrick L. Arias, Miami; Judith M. Linger, Delray Beach; Baiju D. Mandalia, Boca Raton; Oscar E. Ortega, Miami; John C. Sinibaldi, Pompano Beach, all of Fla.

[73] Assignee: International Business Machines Corporation, Armonk, N.Y.

[21] Appl. No.: 250,974

[22] Filed: May 31, 1994

[51] Int. Cl.⁶ .................................................... G06F 12/02
[52] U.S. Cl. ............................ 395/412; 395/474; 395/481
[58] Field of Search ......................... 395/412, 500, 395/416, 405, 410, 600, 200, 823, 412, 474, 481, 494, 495, 497.04, 325; 364/300, 245, 200

[56] References Cited

U.S. PATENT DOCUMENTS 4,827,406 5/1989 Bischoff et al. ..................... 395/480
4,991,169 2/1991 Davis et al. ............................ 370/77
5,010,476 4/1991 Davis ............................... 395/200.01

FOREIGN PATENT DOCUMENTS 0353890 2/1990 European Pat. Off. .

Primary Examiner—David L. Robertson
Attorney, Agent, or Firm—Anthony N. Magistrale; Richard A. Tomlin

[57] ABSTRACT

A digital signal processing system includes first and second logical memory mapping units coupled to first and second digital processors respectively and to a data storage unit. The system further includes first and second mapping registers for containing first and second address mapping information coupled to the first and second digital processors respectively. The first and second mapping units are operative to receive (i) first and second logical addresses generated by the first and second digital processors respectively and (ii) first and second address mapping information respectively, and generate first and second physical addresses such that each of the digital processors can independently access any of a plurality of memory locations within the data storage unit.

6 Claims, 7 Drawing Sheets

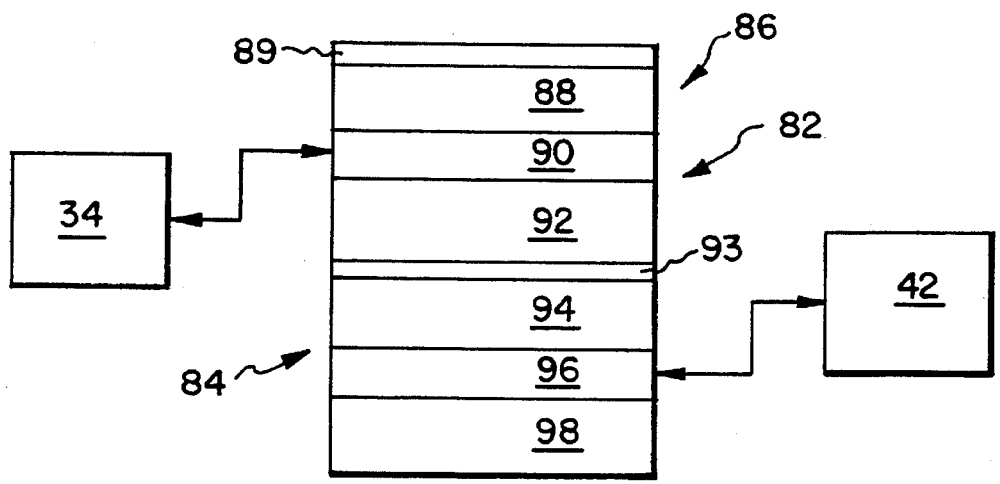
FIG. 5
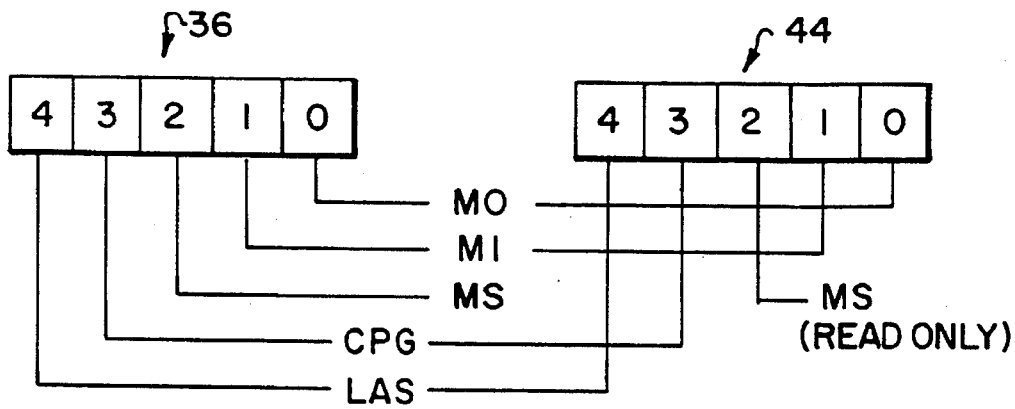
FIG. 6
| CAB 0-3 | RAM SIZE |
|---|---|
| 1011 | 2K WORDS |
| 1100 | |
| 1101 | 8K WORDS |
| 1110 | |
| 1111 | |
FIG. 8
| CPG | MI | MO | CHANNEL |
|---|---|---|---|
| 0 | 0 | 0 | A |
| 0 | 0 | 1 | B |
| 0 | 1 | 0 | C |
| 0 | 1 | 1 | D |
| 1 | 0 | 0 | E |
| 1 | 0 | 1 | F |
| 1 | 1 | 0 | G |
| 1 | 1 | 1 | H |
FIG. 9

| TO ACCESS: | SET MAP REGISTER BITS TO: | | | | | CABO-3 | LOGICAL ADDRESS | ADDRESS MAPPED TO: |
|---|---|---|---|---|---|---|---|---|
| | LAS | CPG | M5 | M1 | M0 | | | |
| PAGE 0 LOOKUP AREA | 0 | X | 1 | X | X | LESS THAN 1011 | 0K-22K | 0K-22K |
| CHANNEL A WORK AREA | X | 0 | 1 | 0 | 0 | 1011 | 22K-24K | 24K-26K |
| CHANNEL B WORK AREA | X | 0 | 1 | 0 | 1 | 1011 | 22K-24K | 26K-28K |
| CHANNEL C WORK AREA | X | 0 | 1 | 1 | 0 | 1011 | 22K-24K | 28K-30K |
| CHANNEL D WORK AREA | X | 0 | 1 | 1 | 1 | 1011 | 22K-24K | 30K-32K |
| CHANNEL A | X | 0 | 1 | 0 | 0 | 11XX | 24K-32K | 32K-40K |
| CHANNEL B | X | 0 | 1 | 0 | 1 | 11XX | 24K-32K | 40K-48K |
| CHANNEL C | X | 0 | 1 | 1 | 0 | 11XX | 24K-32K | 48K-56K |
| CHANNEL D | X | 0 | 1 | 1 | 1 | 11XX | 24K-32K | 56K-64K |
| PAGE 1 LOOKUP AREA | 1 | X | 1 | X | X | LESS THAN 1011 | 0K-22K | 64K-86K |
| CHANNEL E WORK AREA | X | 1 | 1 | 0 | 0 | 1011 | 22K-24K | 88K-90K |
| CHANNEL F WORK AREA | X | 1 | 1 | 0 | 1 | 1011 | 22K-24K | 90K-92K |
| CHANNEL G WORK AREA | X | 1 | 1 | 1 | 0 | 1011 | 22K-24K | 92K-94K |
| CHANNEL H WORK AREA | X | 1 | 1 | 1 | 1 | 1011 | 22K-24K | 94K-96K |
| CHANNEL E | X | 1 | 1 | 0 | 0 | 11XX | 24K-32K | 96K-104K |
| CHANNEL F | X | 1 | 1 | 0 | 1 | 11XX | 24K-32K | 104K-112K |
| CHANNEL G | X | 1 | 1 | 1 | 0 | 11XX | 24K-32K | 112K-120K |
| CHANNEL H | X | 1 | 1 | 1 | 1 | 11XX | 24K-32K | 120K-128K |

FIG. 13

TRANSPARENT MEMORY MAPPING MECHANISM FOR A DIGITAL SIGNAL PROCESSING SYSTEM

BACKGROUND OF THE INVENTION

1. Field of the Invention

The present invention relates generally to digital signal processing systems and more particularly, to first and second logical memory mapping means coupled to first and second digital processors respectively and to a data storage unit for receiving (i) first and second logical addresses generated by the first and second digital processors respectively and (ii) first and second address mapping information respectively, and generating first and second physical addresses such that each of the digital processors can independently access any of a plurality of memory locations within the data storage unit.

2. Description of Related Art

It is well known that applications requiring digital signal processing are expanding tremendously. For example, applications requiring complex real time processing (voice and image processing, pattern and voice recognition, artificial intelligence and scientific computation in general) require filtering (convolution) or correlation operations which are fairly high processor computing power consumers. Digital processing systems are widely utilized for providing information telecommunication services relative to multiple diversely equipped user terminals through high speed digital carrier facilities in a public telecommunication network, and for performing real-time all-digital conversions of signals relative to channels of the digital carrier so as to transmit and receive information in forms associated with user terminal equipment.

For example, U.S. Pat. No. 4,991,169 discloses a telecommunication arrangement for transferring digital information between user data terminals and a processing center (host processor) through a T1 trunk of a common carrier telephone system (public network). The arrangement includes a digital signal processing system between the host processor and the T1 trunk. The public switching network interfaces signals between the user terminals and the T1 trunk. In order to handle the extremely large in-coming and out-going streams of data involved in such arrangements, the system 10 includes two digital signal processors (DSP's) 12 and 14 having a shared instruction memory (IRAM) 16 and a shared data memory (DRAM) 18 as shown in FIG. 1. The system 10 is used to perform, for example, data conversion, convolution and correlation algorithms all of which include table lookup intensive processing.

FIG. 2 shows the DRAM organization used for the system 10 disclosed in U.S. Pat. No. 4,991,169. The DRAM 18 is comprised of 16K address locations and has a word size of 16 bits. DRAM 18 includes a 512 word section 20 for each T1 channel. Up to 24 such sections 20 occupy up to 12,228 words of DRAM 18 for sustaining one T1 line interface. Each section 20 includes work and buffer spaces allocated for reception and transmission processing. DRAM 18 further includes lookup tables comprised of a 3.25K word section 22 for storing filter coefficients, data conversion, etc. and a 512 word section 24 for staging for receive and transmit signaling bits.

The two DSPs 12 and 14 access DRAM 18 in a time interleaved manner when processing information. Each DSP can address up to 32K words (15 bit addressing). Consequently, each DSP 12 and 14 can access the entire DRAM 18. During processing one of the DSPs can perform transmit functions on one channel while the other DSP performs receive operations on an adjacent channel. For example, to process a single byte per channel the system 10 operates in the following manner. DSP 12 accesses data in DRAM transmit work space for channel 1 and links to instruction routines for conversion of data appropriate to the type of data being handled in channel 1. Using these routines, DSP 12 produces a channel byte sample which is stored into the channel 1 transmit buffer space in DRAM 18.

During the foregoing actions performed by DSP 12 above, DSP 14 will be occupying itself with receiving data in another T1 channel (e.g., channel 24). DSP 14 performs this operation by linking to a reception processing routine and accessing data samples currently in DRAM channel 24 receive buffers. DSP 14 then performs conversion processing on received data samples and stores a data byte in the DRAM channel 24 receive work space.

Next, each DSP interrupts the other to transfer processing of outbound data with regard to the channel being processed to the other DSP. More specifically, DSP 14 takes over the handling of outbound data relative to channel 1, links to an instruction routine for transmit interfacing to T1 and passes the data sample formed by DSP 12 over to T1 channel 1. DSP 12 takes over the handling of outbound data relative to channel 24, links to an instruction routine for host interfacing and passes a channel 24 data byte formed by DSP 14 to the host system.

The above-described system suffers from the disadvantage that current table lookup intensive complex digital processing algorithms such as CCITT (International Telegraph and Telephone Consultative Committee) spec V.32 which comprises 9600 bit/s full duplex modems require the DSPs to access large lookup areas and much larger channel spaces using a DRAM that is greater than 32K. In addition, in order to keep complexity and cost to a minimum it is not desirable to increase the number of addressing lines used for each DSP to access the larger DRAM memories required. Thus, there is a need to develop a mapping mechanism for allowing multiple DSPs to share and access more DRAM memory than is logically addressable.

SUMMARY OF THE INVENTION

The present invention is directed to a digital processing system which can operate in any one of three addressing modes. The system includes first and second digital processors each of which being operative to generate a first plurality of logical addresses for accessing a first plurality of memory locations. First and second register means for containing first and second address mapping/mode information are coupled to the first and second digital processors respectively. The system further includes a data storage unit having a second plurality of memory locations each of which having a physical address. The number of memory locations in the data storage unit can be at least twice as large as the number of memory locations that can be logically addressed by each digital processor.

First and second logical memory mapping means are coupled to the first and second digital processors respectively and to the data storage unit. The first and second logical memory mapping means are operative to receive (i) the logical addresses from the first and second digital processors respectively and (ii) the first and second address mapping/mode information respectively and generate first and second physical addresses respectively corresponding to the mode selected.

The system of the present invention can operate in any one of three addressing modes depending on the state of a mode bit in the first register means and the amount of memory available in the data storage unit (DRAM). Each of the two digital signal processors (DSPs) can address, for example, up to 32K memory locations using 15 address bits on their respective common address buses. However, the present invention allows each DSP to access and share more than 32K words in two of the modes. In mode 1, the two DSPs can share 64K words of DRAM when there are 64K words of memory available. In mode 2, the two DSPs can share 128K words of DRAM when there are 128K words of memory available. Lastly, in mode 3 (no memory sharing), each DSP can access its own private 32K memory page when there are 64K words of memory available.

The system of the present invention can support CCITT spec V.32 (9600 bit/s full duplex modems), V.32 bis (14,400 bit/s full duplex modems) and other complex digital signal processing algorithms. In order to support such complex algorithms, the logical addresses generated by each DSP are divided into three sections. The first and second DSPs include first and second logical lookup addresses, first and second logical channel work addresses and first and second logical channel addresses respectively. As an example, the first and second logical lookup addresses can address up to 21.75K words of memory each, the first and second logical channel work addresses can address up to 2K words of memory for each channel and the first and second logical channel addresses can address up to 8K words of memory for each channel.

The physical memory locations in the DRAM are divided into a plurality of sections that complement V.32 and V.32 bis processing and are in accordance with the mode selected. For mode 1, the DRAM comprises a first memory page which includes a first lookup region and a first channel work region located next to the lookup region. The first channel work region includes four T1 channel work areas each having a first equal number of memory locations allocated therefor. A first channel region is located next to the first channel work region. The first channel region includes four T1 channel areas each having a second equal number of memory locations allocated therefor. As an example, the respective memory size of the first lookup region, first channel work region and first channel region can be 21.75K words, 8K words (2K words per work area) and 32K words (8K words per channel area). For mode 2 operation, the system of the present invention can process up to eight T1 channels. In this mode, the data storage unit includes the first memory page and further comprises a second memory page. The second memory page includes a second lookup region located next to the first channel region and a second channel work region located next to the second lookup region. The second channel work region includes four channel work areas each having the first equal number of memory locations allocated therefor. A second channel region is located next to the second channel work region. The second channel region includes four channel areas each having the second equal number of memory locations allocated therefor. As an example, the respective memory size of the second lookup region, second channel work region and second channel region can be 21.75K words, 8K words (2K words per work area) and 32K words (8K words per channel area).

In mode 3, the DRAM is comprised of first and second memory pages. In this mode, there is no memory sharing and each DSP accesses its own page of memory. The first memory page includes a first lookup area which includes lookup data and T1 buffers. Located next to the first lookup area is a first channel work area and a first channel area. The second memory page in the DRAM is similar in organization to that of the first page except that only the second DSP can access the second page. The second page includes a second lookup area, a second channel work area and a second channel area. As an example, the respective memory size of the first and second lookup area, first and second channel work area and first and second channel area can be 22K words, 2K words and 8K words.

The first and second register means are independently programmable by the first and second DSPs respectively. As a result, the addresses mapped by the first memory mapping means is independent of the addresses mapped by the second memory mapping means. Based on the inputs from the first register means and the first plurality of logical addresses, the first memory mapping means can independently map the logical addresses of the first DSP into the physical DRAM memory locations according to the mode selected. Similarly, based on the inputs from the second register means and the first plurality of logical addresses, the second memory mapping means can independently map the logical addresses of the second DSP into the physical DRAM memory locations according to the mode selected.

In mode 1, each DSP shares only the first memory page (e.g., 64K words) of DRAM memory. In this mode, the first and second logical lookup addresses are independently mapped to the first lookup region. The first and second logical channel work addresses are independently mapped to any one of the four channel work areas while the first and second logical channel addresses are independently mapped to any one of the four channel areas.

In mode 2, each DSP can share the first and second memory pages (e.g., 128K words) in the DRAM. The first and second logical lookup addresses are independently mapped to either one of the first and second lookup regions. The first and second logical channel work addresses are independently mapped to any one of the eight physical channel areas in the first and second channel work regions. The first and second logical channel addresses are independently mapped to any one of the eight physical channel areas in the first and second channel regions.

In mode 3, each DSP has its own dedicated memory page (e.g., 32K words). In mode 3, the first logical lookup addresses are mapped into the first lookup area of the DRAM. The first logical channel work addresses and the first logical channel addresses are mapped into the first channel work area and the first channel area of the DRAM. The second logical lookup addresses are mapped into the second lookup area of the DRAM. The second logical channel work addresses and the second logical channel addresses are mapped into the second channel work area and the second channel area of the DRAM.

As a result of each DSP having its own memory mapping means and independently programmable register means, each DSPs addressing can be independent of the other DSP's addressing in each of the three modes. Consequently, each DSP can perform an independent memory access to DRAM. For example, the first DSP can access one channel area while the second DSP accesses a different channel area. This has the added advantage that in modes 1 and 2, the first and second DSPs can both share the same channel area when necessary. This allows one DSP to perform transmit functions while the other DSP performs receive functions on the same channel.

The first and second DSPs are coupled to the DRAM in a time interleaved manner. In addition, the DRAM can have a memory speed which is twice as fast as each of the DSP's access rate. By utilizing these features and splitting the access time for each processor, the present invention has the advantage that each DSP can simultaneously access the same physical address space in the DRAM during the same access cycle. Simultaneous access is provided regardless of whether the first and second DSPs are accessing the same or a different channel area during the access cycle.

BRIEF DESCRIPTION OF THE DRAWINGS

FIG. 5 schematically illustrates the logical to physical memory mapping between each of the two DSPs and the DRAM shown in FIG. 3 during mode 3.

FIG. 6 is a schematic diagram showing the contents of each of the mapping registers shown in FIG. 3.

FIG. 8 is a table showing how the physical channel work and physical channel areas can be mapped into the 2K and 8K logical fields respectively using the four most significant bits of the common address buses CAB1 or CAB2.

FIG. 9 is a table of the states of the channel page select bit CPG and the channel select bits M0, M1 in each mapping register and the channel/channel work areas selected thereby.

FIG. 13 is a table which summarizes the logical to physical address mapping for modes 1 and 2 in accordance with the present invention for each of the lookup, channel work and channel areas along with the corresponding values of the bits in the mapping registers and the four most significant bits on the common address buses.

DETAILED DESCRIPTION OF THE INVENTION

Figure 1:
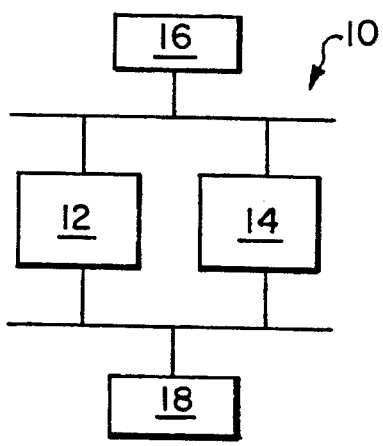
FIG. 1 is a schematic diagram of a prior art digital processing system.
Figure 2:
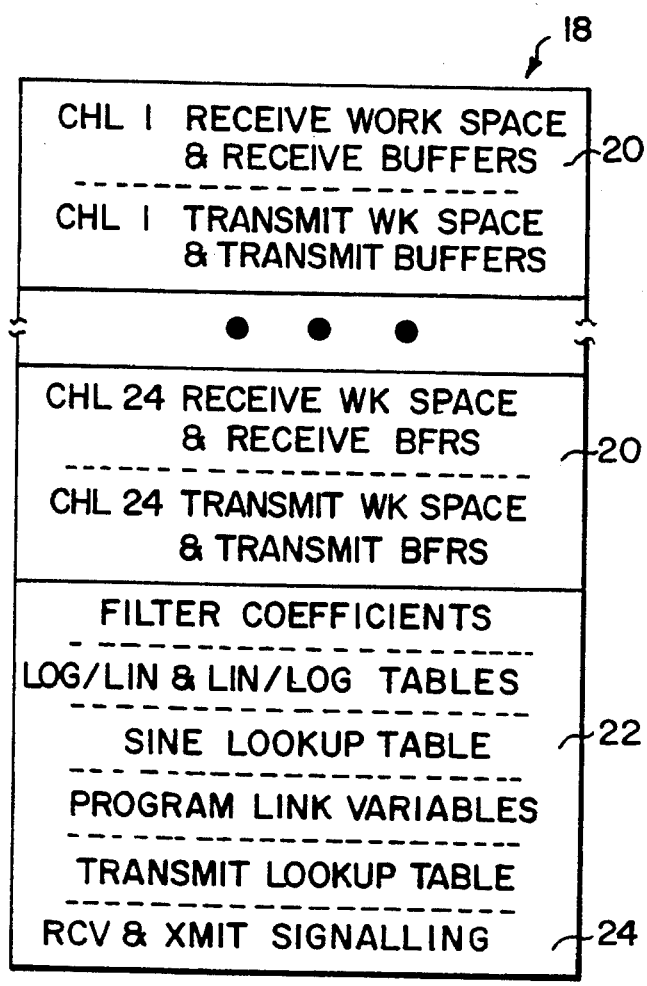
FIG. 2 illustrates the contents and capacities of the prior art data memory shown in FIG. 1.
Figure 3:
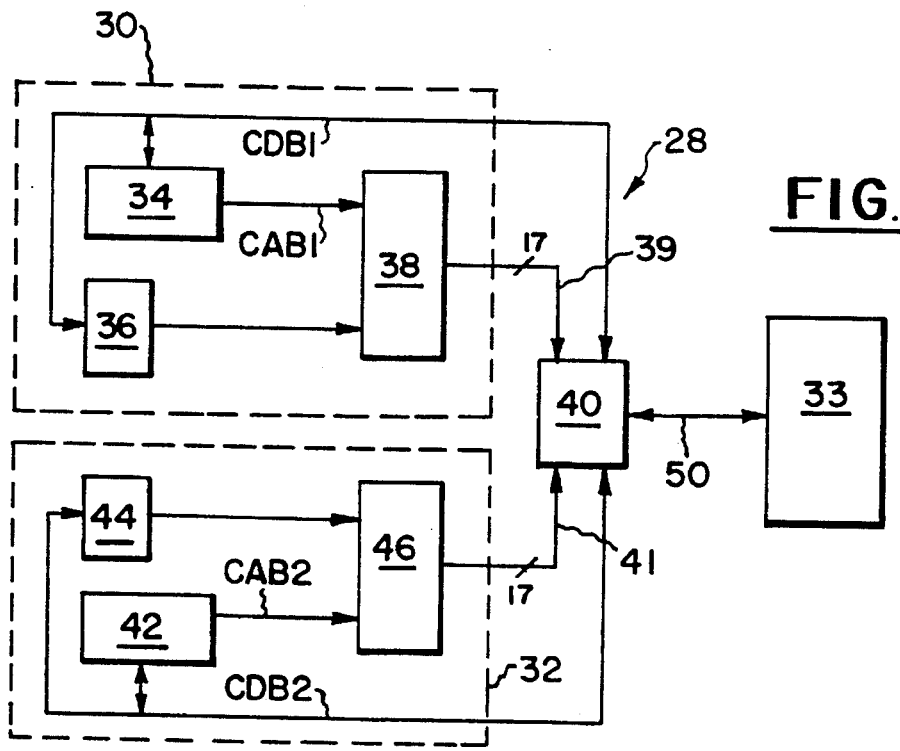
FIG. 3 schematically illustrates the organization of the digital processing system of the present invention.

Referring to FIG. 3 there is shown a schematic diagram of a digital processing system 28 according to the present invention. The system includes first and second DSP blocks 30 and 32 respectively. The system 28 is based on Harvard architecture and as such the DSP blocks 30, 32 share a single copy of instruction memory (IRAM) (not shown) and a single data RAM (DRAM) 33. DSP module 30 includes a DSP 34, a memory mapping register 36 and transparent memory mapping logic (TMML) block 38. Mapping register 36 includes five bits each of which can be set to a desired logic state by DSP 34 via a common data bus (CDB1).

Block 30 includes a common address bus (CAB1) which is coupled between the DSP 34 and TMML 38. The CAB1 comprises 15 address bits (CAB0–14) allowing DSP 34 to address up to 32K memory locations and one bit CAB15 which is kept internal and is used to select 8 bits from a 16 bit word. The 15 address bits CAB0–14 along with the five bits from register 36 are input to logic 38. Based on these two inputs the logic 38 will produce a 17 bit physical address which is input to multiplexer 40 in order to access a memory location in DRAM 33. CDB1 which is coupled to DSP 34 and mapping register 36 is also input to multiplexer 40.

Similarly, block 32 includes a DSP 42, a memory mapping register 44 and memory mapping logic 46. Mapping register 44 includes five bits, four of which can be set to a desired logic state by DSP 42 via common data bus (CDB2). The fifth bit in register 44 is read from register 36. Block 32 includes a common address bus (CAB2) which is coupled between the DSP 42 and transparent memory mapping logic block 46. The CAB2 comprises 15 address bits (CAB0–14) allowing DSP 42 to address up to 32K locations and one bit CAB15 which is kept internal and used as described above. The 15 address bits from CAB2 along with the five bits from register 44 are input to logic 46. Based on these two inputs the logic 46 will produce a 17 bit physical address which is input to multiplexer 40 in order to access a memory location in DRAM 33. CDB2 which is coupled to DSP 42 and mapping register 44 is also input to multiplexer 40.

Multiplexer 40 is operative to couple DSP 34 and DSP 42 to DRAM 33 in a time multiplexed manner for enabling each processor 34, 42 to have a periodic regularly occurring turn at accessing DRAM 33 as described more fully in U.S. Pat. No. 5,010,476 owned in common with this invention. To any extent necessary or appropriate to a full understanding of this invention, U.S. Pat. No. 5,010,476 is hereby incorporated by reference into the present description. The first and second processors 34 and 42 are coupled to the multiplexer by busses 39, CDB1 and 41, CDB2 respectively. The multiplexer 40 is in turn coupled to DRAM 33 by a storage bus 50 which includes a plurality of address lines (17) and a plurality of data lines (e.g., 18 data lines comprised of 16 data bit lines and 2 parity bit lines) for transferring, in a parallel manner, multiple-bit address signals and multiple bit data signals between multiplexer 40 and DRAM 33.

Multiplexer 40 alternately couples the different ones of the DSPs 34 and 42 to the DRAM 33 in a periodic, regularly occurring manner. particular, multiplexer 40 connects the individual conductors in buses 39 and CDB1 to the corresponding individual conductors in bus 50 during a first time interval. Thereafter, during the next time interval, multiplexer 40 connects the individual conductors in 41 and CDB2 to the corresponding individual conductors in the storage bus 50. This switching back and forth between busses 39, CDB1 and 41, CDB2 is repeated over and over again in a continuing manner to alternately connect the two processor busses 39, CDB1 and 41, CDB2 to the storage bus 50. By multiplexing the address lines 39 and 41 and using a memory 33 which is twice as fast as each of the DSP's access rate and splitting the access time for each processor, each DSP can simultaneously access the same physical address space in DRAM 33 during the same access cycle.

The digital processing system 28 shown in FIG. 3 can operate in any one of three addressing modes depending on the state of a mode bit in register 36 and the amount of memory available in DRAM 33. Each of DSPs 34 and 42 can address up to 32K words of RAM with the 15 address bits on their respective common address buses. However, the present invention allows each DSP to access and share more than 32K words in two of the modes. In mode 1, DSP 34 and 42 can share 64K words of DRAM 33 when there are 64K words of memory available. In mode 2, the DSPs 34 and 42 can share 128K words of DRAM 33 when there are 128K words of memory available. Lastly, in mode 3 (no memory sharing), each DSP can access its own 32K memory page when there are 64K words of memory available (e.g., DSPs 34 can access the lower 32K while DSP 42 can access the upper 32K). Each word in DRAM 33 can be comprised of 16 bits.

In the design of multiple DSP systems it is desirable to reduce the number of address bits used by each DSP to access data RAM. Such a reduction reduces the cost and complexity of the system. The present invention accomplishes such a reduction in that only 15 bits are used for each common address bus while each DSP can access and share up to 64K or 128K in modes 1 and 2. Conventional addressing mechanisms would require 16 and 17 bits respectively to address 64K and 128K words of memory.

Figure 4:
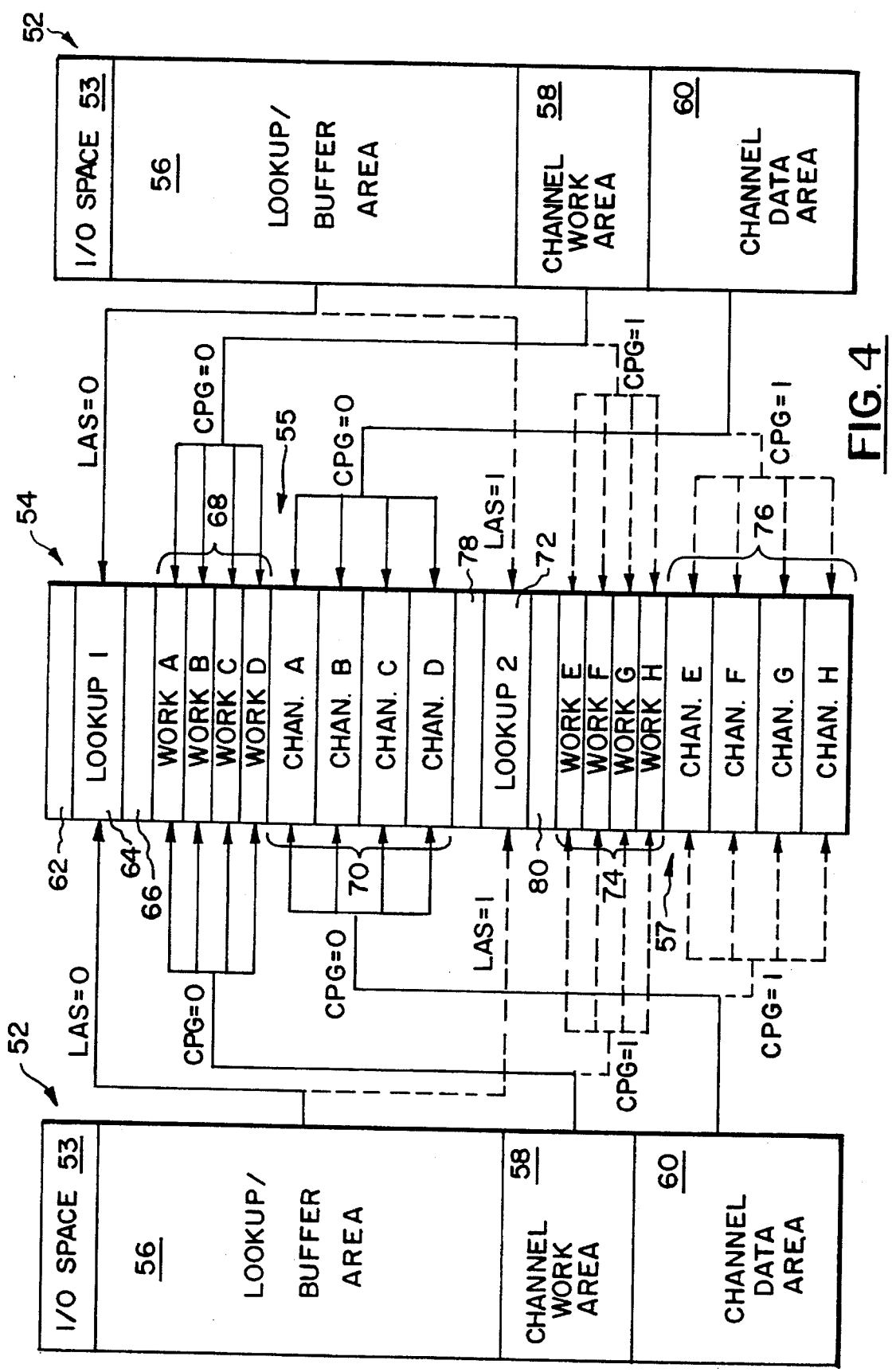
FIG. 4 schematically illustrates the logical to physical memory mapping between each of the two DSPs and the DRAM shown in FIG. 3 during mode 1 or 2.

Turning now to FIG. 4, there is shown a schematic memory mapping diagram for modes 1 and 2 when there are 64K words (mode 1) or 128K words (mode 2) of memory available respectively. (Mode 1 mapping is shown by the solid lines between memories 52 and 54 while mode 2 mapping is shown by the solid and dashed lines.) As will be described in more detail herein below, the memory mapping mechanism of the present invention allows each of DSPs 34 and 42 to access and share the entire 128K range of DRAM 33 or the lower 64K range while only being able to address up to 32K words of RAM. FIG. 4 shows the logical addresses 52 for the 32K addressable range of each of DSPs 34 and 42 as it is mapped into the physical 128K or lower 64K memory 54 of DRAM 33.

The system 28 of the present invention can perform complex digital signal processing algorithms such as, for example, CCITT spec V.32 (9600 bit/s full duplex modems) and V.32 bis (14,400 bit/s full duplex modems) which require complex protocols and lookup intensive processing. In order to support such protocols and DSP algorithms, the logical addresses 52 for each of the two DSPs 34 and 42 are organized as shown in FIG. 4. Each of the DSPs 34 and 42 has its own private memory mapped I/O space 53 which can be comprised of 256 words of memory each. The memory mapped I/Q spaces 53 are reserved for DSPs 34, 42 to access mapping registers 36, 44 respectively and other registers (not shown) of the system. The next 21.75K words are dedicated to a lookup table section 56 for processing static coefficients and state transition tables. The lookup table section 56 includes a 2K logical address section for T1 buffers.

Based on the complex protocols and processing needed for V.32 and V.32 bis, it was determined that 10K words per channel are needed. Accordingly, the next logical 10K of memory 52 will consist of memory mapped channel space. Since normal address translation mechanisms use segmentation registers that access equally sized segments that are powers of 2, the channel space for each of the two DSPs 34 and 42 is divided into a 2K logical address section 58 of channel work area and an 8K logical address channel section 60. By dividing the channel space into 2K and 8K sizes, memory and cost are optimized.

Referring now to the physical address locations of DRAM memory 54, the DRAM memory 54 comprises first and second 64K memory pages 55, 57 respectively. The first section 62 of the first memory page 55 is comprised of 256 words of memory which corresponds to each of DSPs 34 and 42 memory mapped I/O section 53. A host processor (not shown) can be coupled to DRAM memory 54 and can use the 256 word section 62 for diagnostic purposes.

The next physical memory section 64 includes 21.75K words of lookup memory which is shared by DSP 34 and 42. The lookup section 64 includes a 19.75K word section for storing static coefficients and state transition tables for modems and protocols. The lookup area 64 also includes a 2K word section for T1 buffers. The T1 buffers are I/O buffers for multiple logical ports. Data from these ports stream into a circular data memory buffer (not shown). The next 2K word area 66 can also be used by the host processor for diagnostic purposes. The next physical memory region 68 is 8K words of channel work areas. The channel work areas 68 comprise 2K words of work area for each of four channels A, B, C and D for a total of 8K words. The next 32K word section 70 of memory page 55 is the channel region which comprises 8K words for each of channels A through D.

The second 64K memory page 57 is similar in organization to that of the first 64K page 55 except that the second 64K page 57 includes a second 21.75K lookup region 72 (19.75K words of lookup data and 2K words of T1 buffers), 8K channel work section 74 comprised of 2K words of work area for each of channels E, F, G and H, and 32K channel section 76 having 8K words for each one of channels E, F, G, and H. Memory sections 78 and 80 are comprised of 256 and 2K words of memory respectively. The two sections 78 and 80 are reserved for diagnostics.

It should be understood by those skilled in the art of the present invention that the memory sizes 32K, 64K, 128K, the channel work/channel memory sizes 2K/8K and the lookup area memory sizes 21.75K are exemplary only and other memory sizes and configurations for each of the areas are possible in accordance with the teachings of the present invention. In addition, the physical memory 54 can be organized such that the diagnostic areas 62, 66, 78, 80 are used for the channel/channel work or lookup regions for example.

Mode 1 address mapping is shown in FIG. 4 by the solid lines between the logical DSP addresses 52 and the first 64K page 55 of DRAM addresses. In mode 1, each DSP shares only the first 64K page 55 of memory 54. Accordingly, there is only one lookup table and no channel E, F, G or H areas. In mode 1, the lookup section 64 is mapped into the first logical 21.75K area 56 of each DSP's memory range 52. The four channel work areas 68 are mapped into the next logical 2K area 58 while the four channel areas 70 are mapped into the last logical 8K memory area 60.

Mode 2 address mapping is shown in FIG. 4 by the solid and dashed lines between the logical DSP addresses 52 for DSPs 34 and 42 and the physical DRAM addresses. In mode 2, each DSP shares the entire 128K words of memory 54. In mode 2, either one of the lookup sections 64 and 72 is independently mapped into the first logical section 56 of each DSP's memory range 52. Any one of the eight channel work areas 68 and 74 are independently mapped into the next logical 2K area 58 while any one of the eight channel areas 70, 76 are independently mapped into last logical 8K memory area 60.

FIG. 5, shows a schematic block diagram for mode 3 which is used when each DSP is required to have separate and distinct data memories but the same IRAM. In this mode, there is no memory sharing and each DSP accesses its own 32K of memory. The logical memory organization of each DSP is as shown in FIG. 4. However, the physical addresses will be organized as shown in FIG. 5. DSPs 34 can access the first 32K page 82 while DSP 42 can access the second 32K page 84. This addressing is accomplished with the respective common address buses and a page select bit which is in mapping registers 36 and 44 and will be described in more detail below.

Referring now to the physical address locations of DRAM memory 86 for mode 3, the first section 88 of memory 86 is comprised of 21.75K words of lookup memory which is accessable by DSP 34 only. The lookup section 88 includes a 19.75K word section for storing static coefficients and state transition tables as described above. The lookup area 88 also includes a 2K word section for T1 buffers. The next physical memory area 90 is comprised of 2K words of channel work area for channel A. The next section 92 of memory 86 comprises 8K words for channel A.

The second 32K page 84 of memory 86 is similar in organization to that of the first 32K page 82 except that only the second DSP 42 can access the second 32K page 84. The second 32K page 84 includes a second 21.75K lookup area 94 (19.75K words of lookup data and 2K words of T1 buffers), 2K channel work area 96 for channel B and 8K channel area 98 for channel B. Memory sections 89 and 93 are comprised of 256 words of memory. The two sections 89 and 93 correspond to each of DSPs 34 and 42 memory mapped I/O section 53 and are reserved for diagnostics.

In mode 3, each DSP has its own dedicated 32K memory section. In mode 3, the lookup area 88 is mapped directly into the first logical section 56 of DSP 34. The channel work area 90 and the channel area 92 are mapped into the next logical 2K section 58 and 8K section 60 respectively of DSP 34. The second lookup section 94 is mapped directly into the first logical section 56 of DSP 42. The channel work area 96 and the channel area 98 are mapped into the next logical 2K section 58 and 8K section 60 respectively of DSP 42.

Turning to FIG. 6, there is shown a schematic diagram of the bits used for each of registers 36 and 44. Each of DSPs 34 and 42 has its own memory map programming register so that the address mapping for each DSP is independent of what the other DSP is addressing. The operating system of each DSP 34, 42 is operative to program each bit of its respective map register 36, 44 in order to access the correct lookup, channel work and channel areas during processing in accordance with the address mapping shown in FIGS. 4 and 5.

Mapping register 36 includes a Mode Select bit (MS) which along with the amount of memory available is used to select between modes 1, 2 and 3. The MS bit is read by the second DSP 42 and copied into register 44 in order for DSP 42 to determine the correct mode of operation. The MS bit can only be programmed by DSP 34 and a read only copy of the MS bit (MS(copy)) is placed in register 44. A channel page select bit (CPG) is present in both registers 36 and 44 and is used to select between a) the first four channel and channel work areas 68, 70 or b) the second four channel and channel work areas 74, 76 of memory 54 in mode 2. The CPG bit is also used in mode 3 to select the first or second 32K page of memory 86.

M0 and M1 are channel select bits and are used in modes 1 and 2 to select which of the four channel work areas and which of the four channel areas are addressed within the four channel and four channel work areas selected by the CPG bit. For example, if the first four work/channel areas 68, 70 are selected by CPG, then M0 and M1 are used to select between channels A, B, C and D, while if the second four work/channel areas 74, 76 are selected, then M0 and M1 are used to select between channels E, F, G and H.

Mapping registers 36 and 44 also include a Lookup Area Select bit (LAS) which is used in mode 2 (independent of CPG) to select between the first and second lookup areas 64 and 72 respectively. Accordingly, each DSP can perform operations using either one of the first or second lookup areas 64, 72 regardless of which channel areas are being processed by each DSP. For example, in mode 2, the logical lookup area 56 of DSP 34 can be mapped to either one of the first or second lookup regions 64, 72 while the logical channel work/channel areas 58, 60 are independently mapped to any one of the eight channel work/channel areas A–H. During the same cycle and independent of DSP 34 mapping, the logical lookup area 56 of DSP 42 can be mapped to either one of the first or second lookup regions 64, 72 while the logical channel work/channel areas 58, 60 are independently mapped to any one of the eight channel work/channel areas A–H.

Based on the inputs from register 36 and CAB1, TMML 38 will map the logical DSP addresses 52 of DSP 34 into the physical DRAM memory locations according to the maps shown in FIGS. 4 and 5 for modes 1, 2 and 3 respectively. Similarly, based on the inputs from register 44 and CAB2, TMML 46 will map the logical DSP addresses 52 of DSP 42 into the physical DRAM memory locations according to the maps shown in FIGS. 4 and 5 for modes 1, 2 and 3 respectively.

As a result of each DSP having its own TMML and independently programmable mapping register, each of DSPs 34, 42 addressing can be independent of the other DSP's addressing in each of the three modes. Accordingly, each DSP can perform operations on any one of the channels in DRAM 33 independent of which channel the other DSP is working on. In addition, since the DSPs 34, 42 are coupled to DRAM 33 in a time interleaved manner via multiplexer 40 as described above, each DSP can perform an independent memory access to any one of the channels in DRAM 33 during the same memory access cycle. For example in mode 1 or 2, DSPs 34 can access the channel A work/channel A areas while DSP 42 accesses the channel D work/channel D areas during the same cycle.

The independent mapping of the present invention has the added advantage that in modes 1 and 2 DSP 34 and 42 can both share the same channel area when necessary during a memory cycle. For example, if channel A requires complex algorithm processing while channel C needs comparatively simpler processing, DSPs 34 and 42 can perform operations on channel A. After channel A processing is completed both DSPs can work on channel C. In addition, one DSP can perform transmit functions while the other DSP performs receive functions on the same channel during the same memory cycle.

Figure 7:
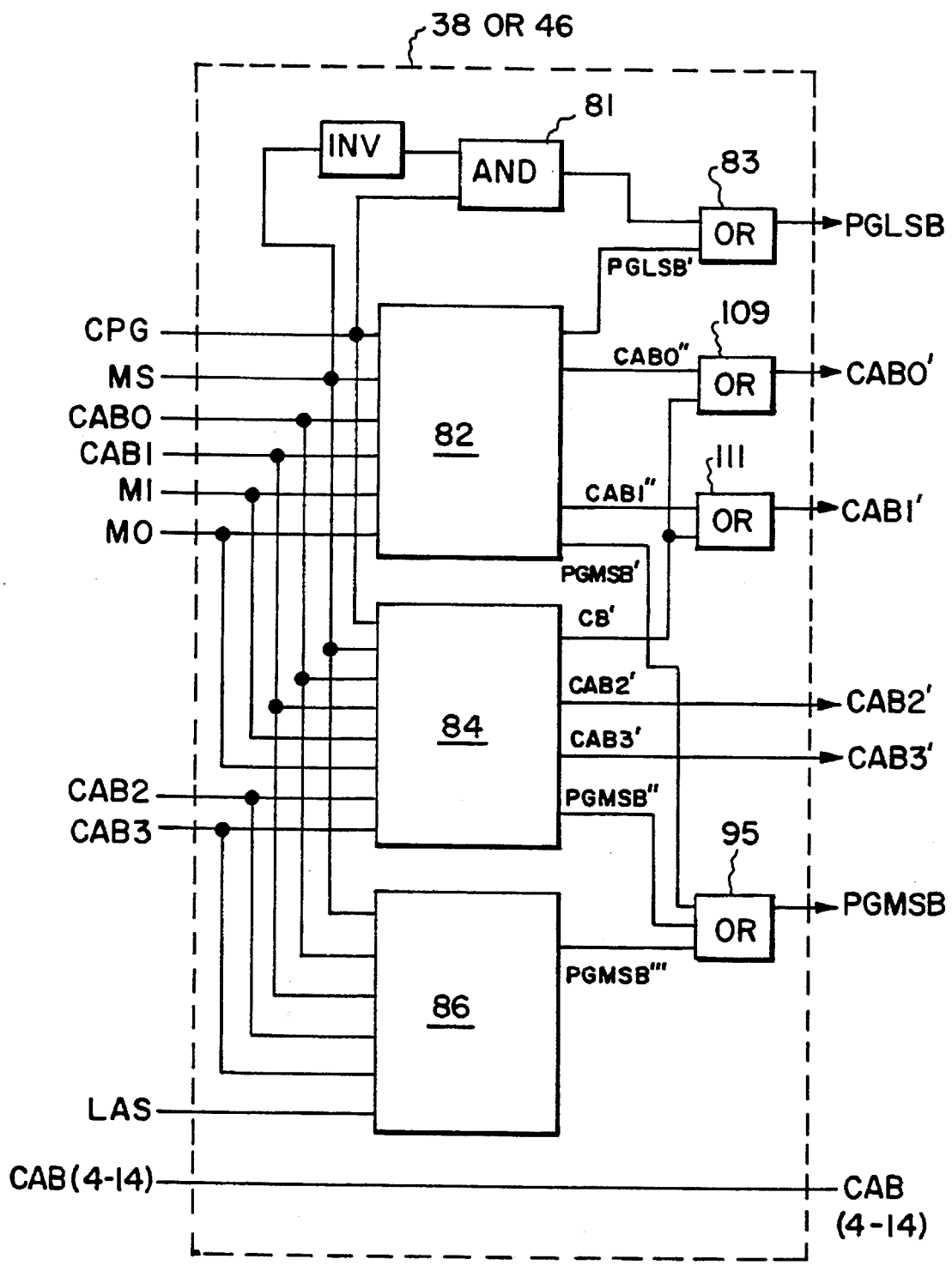
FIG. 7 is a block diagram of the transparent memory mapping logic blocks shown in FIG. 3.

Referring now to FIG. 7, there is shown a block diagram of transparent memory mapping logic 38 or 46 which implements the memory map shown in FIGS. 4 and 5. As shown in FIG. 7, the blocks 38, 46 receive as inputs, five bits from mapping register 36, 44 respectively and the four most significant address bits (CAB0–3) on the common address buses CAB1, CAB2 respectively. Based on the values of these inputs, the mapping mechanism 38, 46 will produce six output bits (CAB0'-3', PG MSB, and PG LSB). These six bits along with eleven bits from the common address bus (CAB4-14) are used to provide the 17 bit address line 39 (see FIG. 3) which corresponds to the physical address in DRAM 33.

Logic block 82 is used in mapping any one of the eight channel areas 70, 76 (channels A–H) into the DSPs logical 8K field 60 while logic block 84 is used in mapping any one of the eight physical channel work areas 68, 74 (work areas A–H) into the DSPs logical 2K field 58. Logic block 86 is used to map the first and second physical lookup areas 64, 72 respectively into the DSPs logical 21.75K field 56. AND gate 81 and OR gate 83 are used in mode 3 to select between the upper and lower 32K memory page.

The physical mapping of the 1 OK logical area 58, 60 is carried out by utilizing address bits CAB0–3 of the common address buses CAB1 and CAB2 along with the CPG, M0 and M1 bits of the map registers 36 and 44 respectively. Referring to FIG. 8, there is shown a table of the physical channel map area. By using the four most significant bits of the common address bus CAB0–3, the remaining eleven bits can be used to address up to 2K words. The physical channel areas 70, 76 can be mapped into the logical 8K field CAB0–1(11) by using bits CPG, M0 and M1 that can be programmed by the DSP when CAB0–1=11. FIG. 9 shows the states of CPG, M0 and M1 in each mapping register to access any one of channels areas A–H or any one of channel work areas A–H.

Figure 10:
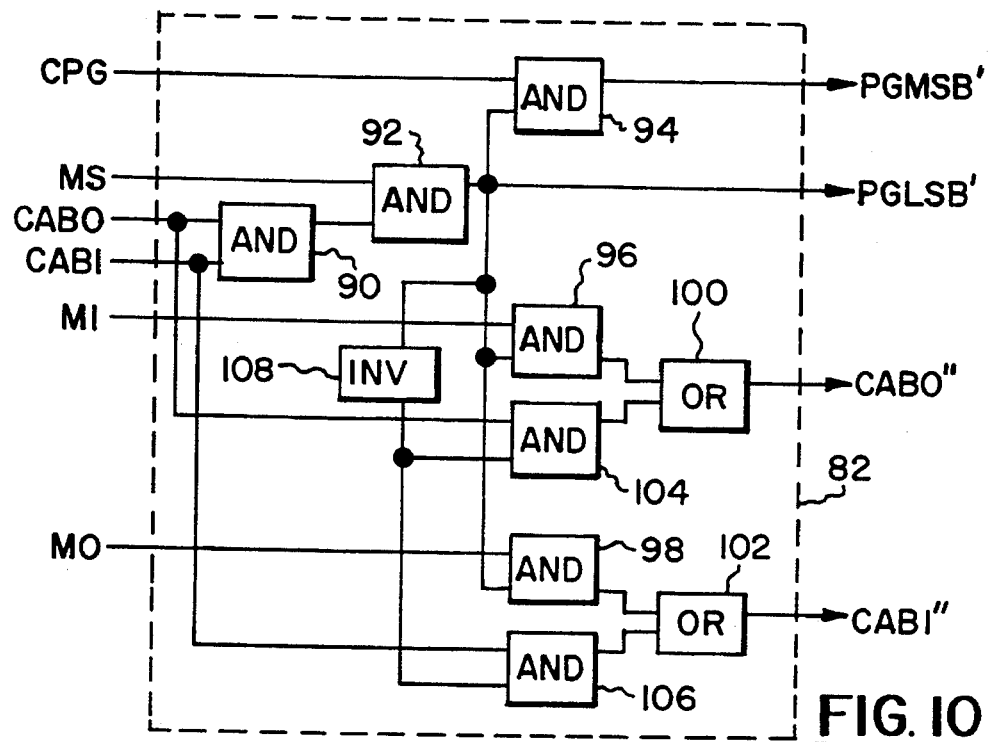
FIG. 10 is a detailed schematic diagram of decode block 82 shown in FIG. 7.

Turning now to FIG. 10, there is shown a detailed schematic diagram of logic block 82 along with the address lines that allow the 8K channel areas 70, 76 to be mapped into the logical 8K field CAB0–1(11) using the channel page select bit CPG and the channel select bits M0, M1. If the DSP wishes to access any of the 8K channel areas 70, 76 and selects mode 1 or 2 operation, then the DSP will set the mode bit high as well as CAB0–1 to 11. Consequently, the output of AND gates 90 and 92 will also be high.

The output of AND gate 92 (PG LSB') drives the PG LSB bit (FIG. 7) high making the physical RAM address in the range 32–64K (channels A–D in area 70)) or 96–128k (channels E–H in area 76). In addition, the output of gate 92 gates the CPG bit through gate 94 to select which 32K block is addressed. Consequently, PG MSB' out of gate 94 will be equal to the CPG bit. In addition, PG MSB" and PG MSB"Δ will be set to logic 0 by logic blocks 84 and 86 respectively such that the output of OR gate 95 (PG MSB) (FIG. 7) will be equal to the CPG bit. Thus, by setting the CPG bit, each DSP can select which 32K channel block is addressed (32–64K block 70 if DSP sets CPG to 0 or 96–128k block 76 if DSP sets CPG to 1).

The output of AND gate 92 is coupled to AND gates 96 and 98 the outputs of which are fed into OR gates 100 and 102 respectively. Consequently, when the output of AND gate 92 is high, gates 96 and 98 will gate the channel select bits M0, M1 onto CAB0'1' to select which of the four 8K blocks within the selected 32K is addressed in accordance with the table shown in FIG. 8. For example, if the 32K block 76 is selected (CPG=1, CAB0–1=11), then channel G is selected by setting M0, M1 to 10. When the DSP is not mapping one of the 8K channel areas (CAB0–1 does not equal 11 or mode=0), the output of gate 92 is low thereby negating the outputs of gates 96 and 98 while allowing CAB0–1 to pass through gates 104, 106 unaltered using inverter 108.

Figure 11:
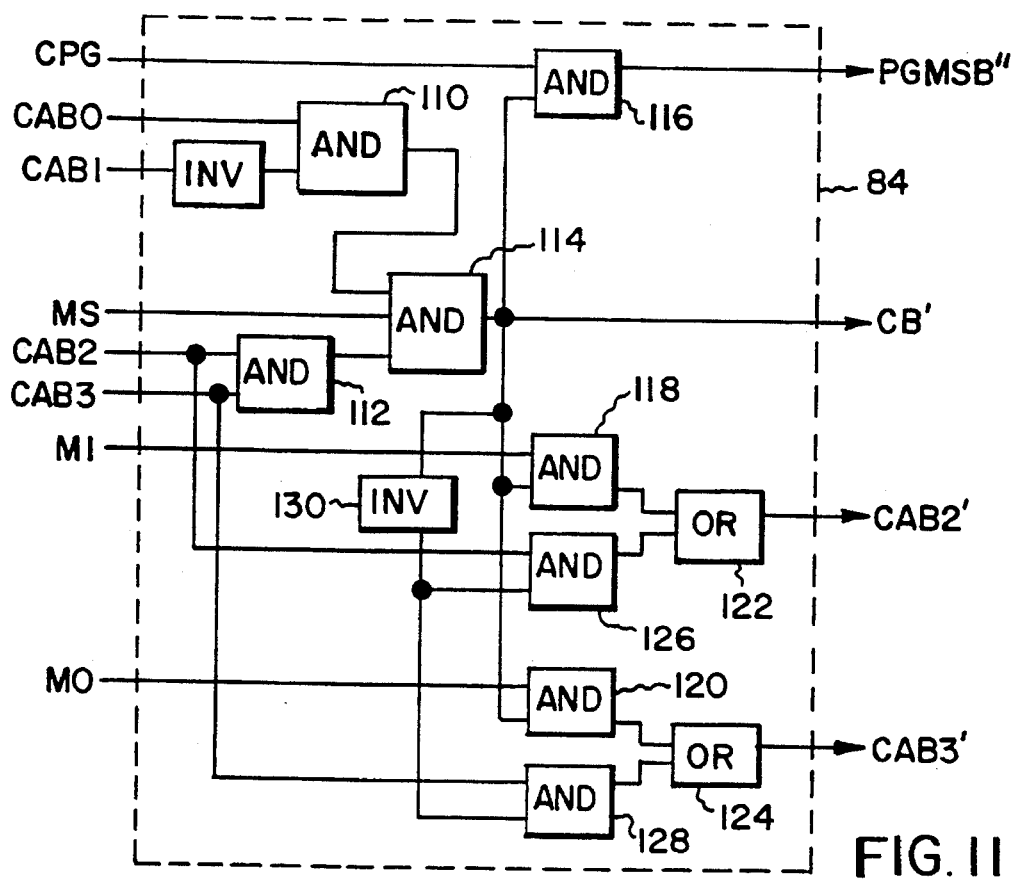
FIG. 11 is a detailed schematic diagram of decode block 84 shown in FIG. 7.

Turning now to FIG. 11, there is shown a detailed schematic diagram of logic block 84 along with the address lines that allow the 2K channel work areas 68, 74 to be mapped into the logical 2K field CAB0–3(1011) using channel select bits M0, M1. If the DSP wishes to access any of the 2K channel work areas 68, 74 and selects mode 1 or 2 operation, then the DSP will set CAB0–3 to 1011. Consequently, the output of AND gates 110, 112 and 114 will be high. The PG LSB will be driven low when CAB0–1(10) (see FIG. 9) thereby producing a physical address in the range of 0–32K or 64–96K.

The output of gate 114 gates the CPG bit through gate 116 to select which 32K block is addressed. Consequently, PG MSB" out of gate 116 will be equal to CPG. In addition, PG MSB' and PG MSB"Δ will be set to logic 0 by logic blocks 82 and 86 respectively such that the output of OR gate 95 (PG MSB) (FIG. 7) will be equal to the CPG bit. Bits CAB0'–140 will be driven high by the output of gate 114 (CB') which is applied to OR gates 109 and 111 (see FIG. 7). This will make the physical address range 24K–32K (area 68) or 88K–96K (area 74) depending on the CPG bit.

The output of AND gate 114 is coupled to AND gates 118 and 120 the outputs of which are fed into OR gates 122 and 124 respectively. Consequently, when the output of AND gate 114 is high, gates 118 and 120 will gate the channel select bits M0, M1 onto CAB2'–340 to select which of the four 2K blocks within the selected 8K is addressed in accordance with the table shown in FIG. 8. For example, if the 8K block 68 is selected (CPG=0, CAB0–3=1011), then channel B work area is selected by setting M0, M1 to 01. When the DSP is not mapping one of the 2K channel work areas (CAB0–3 does not equal 1011 or mode=0), the output of gate 114 is low thereby negating the outputs of gates 118 and 120 while allowing CAB2–3 to pass through gates 126, 128 unaltered using inverter 130.

Figure 12:
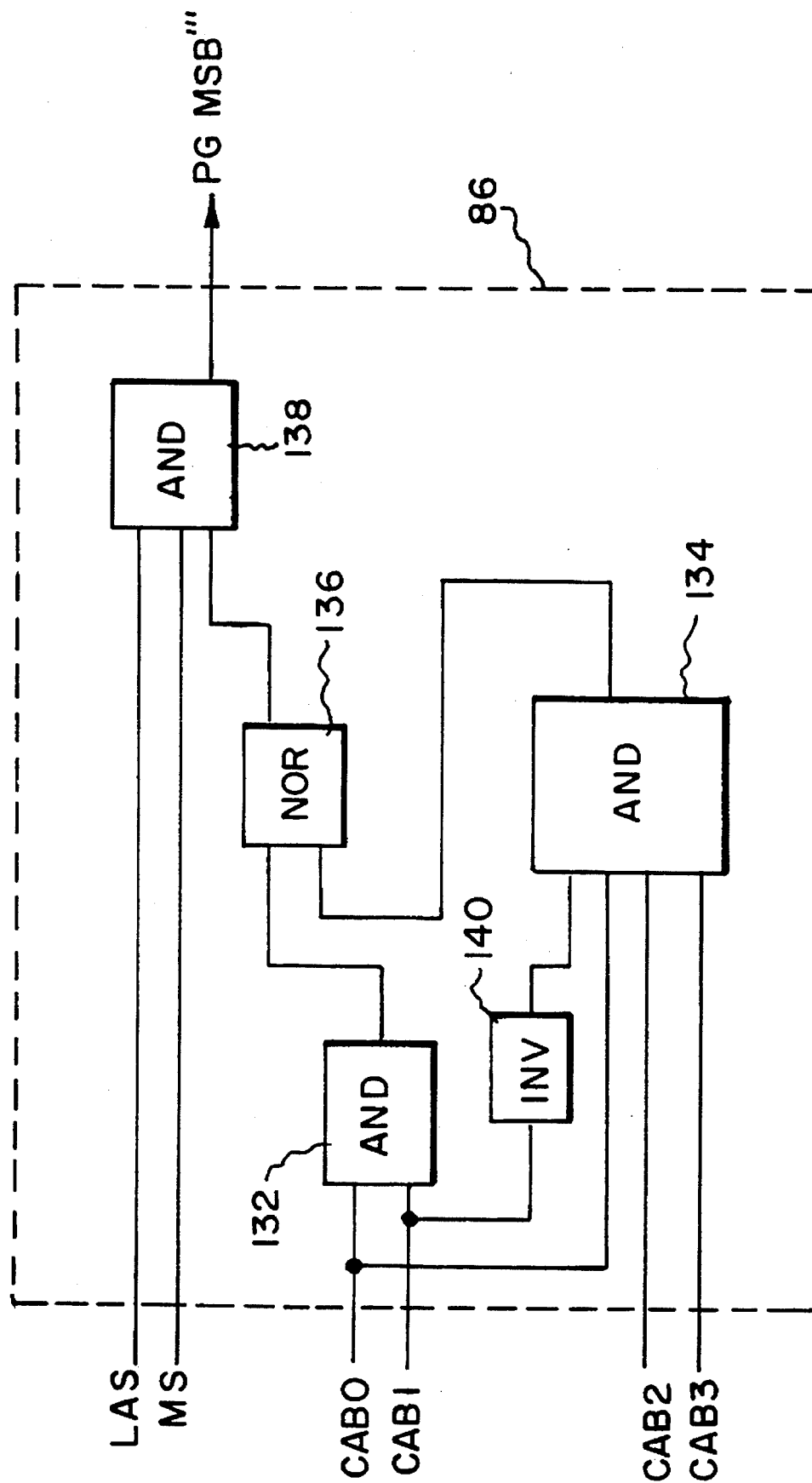
FIG. 12 is a detailed schematic diagram of decode block 86 shown in FIG. 7.

Turning now to FIG. 12, there is shown a detailed schematic diagram of logic block 86 along with the address lines that allow the 21.75K word lookup tables 64, 72 to be mapped into the logical 22K field CAB0–3<1011 using the LAS bit. If the DSP wishes to access any one of the lookup areas 64, 72 and selects mode 1 or 2 operation, then the DSP will set CAB0–3 to less than 1011.

For example, if CAB0–3=1001, the output of AND gates 132 and 134 will be low. Consequently, NOR gate 136 will generate a high output and the LAS bit will be gated through AND gate 138 as the PG MSB'". In addition, PG MSB' and PG MSB" will be set to logic 0 by logic blocks 82 and 84 respectively such that the output of OR gate 95 (PG MSB) (FIG. 7) will be equal to the CPG bit. Thus, the physical address range will be in the range 0K–22K (lookup table 64) or 64K–86K (lookup table 72) depending on whether the LAS bit is low or high respectively.

When the DSP wishes to access any of the 8K channel areas 70, 76 or any of the 2K channel work areas 68, 74 NOR gate 136 will prevent the LAS bit from being gated through gate 138. More specifically, gate 132 will generate a high output if any of the 8K channel areas 70, 76 are being addressed (CAB0–1=11). Gate 134 will generate a high output if any of the 2K channel work areas 68, 74 are being addressed (CAB0–3=1011) by coupling inverter 140 to CAB1. When either of these conditions exist, NOR gate 136 will generate a low output thereby preventing the LAS bit from being gated through gate 138.

The results of the above-described transparent memory mapping is summarized in a table shown in FIG. 13. The table illustrates the access of the various physical memory ranges from 0K–128K using the transparent memory mapping mechanism of the present invention. The table lists each of the lookup, channel and channel work areas along with the logical DSP and physical DRAM addresses for each area. The table shows the physical address to which each of the areas are mapped depending on the values of CAB0–3 and the five bits in the mapping register as described above.

The first 64K page illustrates mode 1 operation while the entire 128K table illustrates mode 2 operation.

For mode 1 operation, the MS bit in register 36 is set high by DSP 34, copied into register 44 and read by DSP 42 but the CPG bit in registers 36 and 44 are set to logic 0 to access the four work and channel areas 68, 70 in the first 64K page 55 of memory 54. The LAS bit in registers 36, 44 is also set to logic 0 by DSPs 34, 42 respectively since there is only one shared lookup table in mode 1. When CAB0–1 is set to (11) by DSP 34 and/or DSP 42 on its respective address bus M0, M1 in registers 36, 44 are used to select any one of the four channel areas A–D. When CAB0–3 is set to (1011) by DSP 34 and/or DSP 42 on its respective address bus M0, M1 are used to select any one of the four channel A–D work areas.

For example, during a mode 1 memory access cycle, the logical work area 58 of DSPs 34 can be mapped to the physical channel A work area by setting CAB0–3 on CAB1 to (1011) and MS, CPG, M0, M1 in register 36 to 1000 respectively. Next, the logical channel area 60 of DSPs 34 can be mapped to the physical channel A area by setting CAB0–1 on CAB1 to (11) and MS, CPG, M1, M1 in register 36 to 1000 respectively. The above information will be received by TMML 38 which will map the logically addressable areas 58 and 60 of DSP 34 to the physical, 24–26K and 32–40K regions respectively of DRAM memory 54 as shown in the table.

During the same memory access cycle, the logical area 58 of DSP 42 can be mapped to the physical channel C work area by reading the read only copy of the MS bit in register 44 and setting CAB0–3 on CAB2 to (1011) and CPG, M0, M1 in register 44 to 001 respectively. Next, the logical channel area 60 of DSP 42 can be mapped to the physical channel C area by setting CAB0–1 on CAB2 to (11) and CPG, M0, M1 in register 36 to 001 respectively. The above information will be received by TMML 46 which will map the logically addressable areas 58 and 60 of DSP 42 to the physical 28–30K and 48–56K regions respectively of DRAM memory 54 as shown in the table. As noted above, instead of accessing the work and channel C areas, DSP 42 could have also accessed the work and channel A areas to perform for example, transmit functions while DSP 34 performs receive functions during the same cycle.

Referring to FIG. 13, during mode 2 operation, the MS bit in register 36 is also set by DSP 34 to logic 1, copied into register 44 and read by DSP 42. The CPG bit in registers 36 and 44 is used by DSPs 34 and 42 respectively to select between the four work and channel areas 68, 70 (CPG(0)) and the four work and channel areas 74, 76 (CPG(1)) of memory 54. When CAB0–1 is set to (11) by DSP 34 and/or DSP 42 on its respective address bus M0, M1 in registers 36 and 44 are used by DSPs 34 and 42 respectively to select any one of the four channel areas selected by CPG. When CAB0–3 is set to (1011) by DSP 34 and/or DSP 42 on its respective address bus M0, M1 are used to select any one of the four channel work areas selected by CPG.

Thus, the CPG, M0 and M1 bits in registers 36 and 44 are used by DSPs 34 and 42 respectively to independently access any one of the eight channel work areas 68, 74 and any one of the eight channel areas 70, 76. Independent of the channel and work areas being accessed, the LAS bit in registers 36 and 44 is used by DSPs 34 and 42 respectively to select either one of the first and second lookup areas 64, 72.

For example, during a mode 2 memory access cycle, the logical areas 56 of DSPs 34 can be mapped to the second lookup area 72 by driving CAB0–3 on CAB1 to less than 1011 and MS, LAS in register 36 to 11. Next, the logical work area 58 of DSPs 34 can be mapped to the physical channel B work area by setting CAB0–3 on CAB1 to (1011) and MS, CPG, M0, M1 in register 36 to 1010 respectively. Lastly, the logical channel area 60 of DSPs 34 can be mapped to the physical channel B area by setting CAB0–1 on CAB1 to (11) and MS, CPG, M0, M1 in register 36 to 1010 respectively. The above information will be received by TMML 38 which will map the logically addressable areas 56, 58 and 60 of DSP 34 to the physical 64–86K, 26–28K and 40–48K regions respectively of DRAM memory 54 as shown in the table.

During the same memory access cycle, the logical area 56 of DSP 42 can be mapped to the second lookup area 72 by reading the MS(copy) bit in register 44 and setting CAB0–3 on CAB2 to less than 1011 and LAS in register 36 to 1. Next, the logical work area 58 of DSP 42 can be mapped to the physical channel G work area by setting CAB0–3 on CAB2 to (1011) and CPG, M0, M1 in register 44 to 101 respectively. Lastly, the logical channel area 60 of DSP 42 can be mapped to the physical channel G area by setting CAB0–1 on CAB2 to (11) and CPG, M1, M1 in register 36 to 101 respectively.

This information will be received by TMML 46 which will map the logically addressable areas 56, 58 and 60 of DSP 42 to the physical 64–86K, 92–94K and 112–120K regions respectively of DRAM memory 54 as shown in the table. As noted above, instead of accessing the work and channel G areas, DSP 42 could have also accessed the work and channel B areas to perform for example, transmit functions while DSP 34 performs receive functions during the same cycle.

It should be noted that the MS, MS(copy), CPG, M0 and M1 bits in any one of registers 36, 44 are identical in modes 1 and 2 for a particular channel area and its corresponding channel work area. This optimizes the amount of code used in the system of the present invention. DSPs 34, 42 only have to change the address bits CAB0–3 on address buses CAB1, CAB2 respectively to switch between a particular channel area and its corresponding channel work area. Accordingly, the MS, MS(copy), CPG, M0 and M1 bits in mapping registers 36, 44 only have to be written once when switching from one channel to another.

For mode 3 operation, the MS bit in register 36 is set by DSP 34 to logic 0, copied into register 44 and read by DSP 42. The CPG bit in register 36 is set to logic 0 so that PG MSB is 0 and DSP 34 will access the first 32K page 82 of memory 86. The CPG bit in register 44 is set to logic 1 so that PG MSB is 1 for DSP 42 memory accesses and 42 will access the second 32K page 84 of memory 86. The channel select bits M0, M1 and the LAS bits are not used in mode 3.

As an example of a mode 3 memory access cycle, DSPs 34 can logically address the channel A area 92 by setting CAB0–1 on CAB1 to (11) and setting MS, CPG to 00 respectively. This information will be received by TMML 38 which will directly map the logically addressed 24–32K region 60 of DSP 34 to the physical 24–32K region 92 of memory 86. During the same cycle, DSP 42 can logically address the channel B work area 96 by reading MS(copy)(0) from register 44 and setting CAB0–3 on CAB2 to (1011) and CPG to 1. These bits are received by TMML 46 which will map the logically addressed 22–24K region of DSP 42 to the physical 54–56K region 96 of memory 86. There is no memory sharing in mode 3 and each DSP cannot perform processing the same channel.

Although the present invention was described above with regard to data RAM usage, it should be understood by those skilled in the art that the present invention can also apply to non-Harvard architecture processors. It should also be understood that the present system can be a one mode system which is capable of only working in any one of the three modes described above.

In addition, it should be understood by those skilled in the art of the present invention that the memory sizes 32K, 64K, 128K and the lookup area, channel work and channel memory sizes 21.75, 2K and 8K respectively are exemplary only and other memory configurations and memory sizes are possible in accordance with the teachings of the present invention. For example, the DRAM memory can be increased to 256K words and support four DSPs, sixteen channels and four lookup areas using two CPG bits and two LAS bits. Each of the four DSPs can access any one of the sixteen channel work areas and any one of the sixteen channel areas.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. An addressable mode selectable digital information processing system comprising:

first and second digital processors each of which being operative to generate first and second logical addresses respectively for accessing a first plurality of memory locations, first and second register means for containing first and second address mapping/mode information coupled to said first and second digital processors, data storage means having a second plurality of memory locations each of which having a physical address, said second plurality being greater than said first plurality, first and second logical memory mapping means coupled to said first and second digital processors respectively and to said data storage means, said first and second logical memory mapping means being operative to receive (i) said first and second logical addresses from said first and second digital processors respectively and (ii) said first and second address mapping/mode information respectively and generate first and second physical addresses corresponding to a mode selected, and, wherein said data storage means includes a first memory page comprising:

a first lookup region, a first channel work region located next to said first lookup region, said first channel work region having four channel work areas each having a first equal number of memory locations allocated therefor, and a first channel region located next to said first channel work region, said first channel region having four channel areas each having a second equal number of memory locations allocated therefor, said first and second digital processors being operative to access said first lookup, any one of said four channel work areas and any one of said four channel areas during a memory access cycle, and, wherein said system is in a first mode, said first and second logical addresses for said first and second digital processors are arranged as first and second logical lookup addresses, first and second logical channel work addresses and first and second logical channel addresses respectively, said first and second memory mapping means being operative to receive four most significant bits of said first and second logical addresses respectively and said first and second mapping/mode information from said first and second register means respectively and generate said first and second physical addresses such that;

said first and second logical lookup addresses are independently mapped to said first lookup region, said first and second logical channel work addresses are independently mapped to any one of said four physical channel work regions, and said first and second logical channel addresses are independently mapped to any one of said four physical channel regions, and, wherein said first and second register means comprises:

first and second map registers each having a plurality of bits, said first and second digital processors being operative to program said plurality of bits in said first and second map registers to a desired combination in order to access a particular one of said four channel work areas and a particular one of said four channel areas, and, wherein said first map register further includes a mode bit and said second map register further includes a read only copy of said mode bit, said first mode being selected by said first digital processor by setting said mode bit to a second logic state when said second plurality of memory locations is equal to two times said first plurality of logically addressable memory locations.

2. The system according to claim 1, wherein said data storage means comprises 64K words of memory in said first memory page, said first lookup region comprises 21.75K words of memory, said first channel work region comprises 8K words of memory and each of said four channel work areas comprise 2K words of memory, and said first channel region comprises 32K words of memory and each of said four channel areas comprise 8K words of memory.

3. An addressable mode selectable digital information processing system comprising:

first and second digital processors each of which being operative to generate first and second logical addresses respectively for accessing a first plurality of memory locations, first and second register means for containing first and second address mapping/mode information coupled to said first and second digital processors, data storage means having a second plurality of memory locations each of which having a physical address, said second plurality being greater than said first plurality, first and second logical memory mapping means coupled to said first and second digital processors respectively and to said data storage means, said first and second logical memory mapping means being operative to receive (i) said first and second logical addresses from said first and second digital processors respectively and (ii) said first and second address mapping/mode information respectively and generate first and second physical addresses corresponding to a mode selected, wherein said data storage means includes a first memory page comprising:

a first lookup region, a first channel work region located next to said first lookup region, said first channel work region having four channel work areas each having a first equal number of memory locations allocated therefor, and a first channel region located next to said first channel work region, said first channel region having four channel areas each having a second equal number of memory locations allocated therefor, said first and second digital processors being operative to access said first lookup, any one of said four channel work areas and any one of said four channel areas during a memory access cycle, wherein said data storage means includes a second memory page comprising:

a second lookup region located next to said first channel region, a second channel work region located next to said second lookup region, said second channel work region having four channel work areas each having said first equal number of memory locations allocated therefor, and a second channel region located next to said second channel work region, said second channel region having four channel areas each having said second equal number of memory locations allocated therefor, wherein said first and second digital processors are operative to access any one of said first and second lookup regions, any one of said eight channel work areas in said first and second channel work regions and any one of said eight channel areas in said first and second channel regions during a memory access cycle, wherein said system is in a second mode and:

said first and second logical addresses of said first and second digital processors are arranged as first and second logical lookup addresses, first and second logical channel work addresses and first and second logical channel addresses respectively, said first and second memory mapping means being operative to receive four most significant bits of said first and second logical addresses respectively and said first and second mapping/mode information from said first and second register means respectively and generate said first and second physical addresses such that;

said first and second logical lookup addresses are independently mapped to either one of said first and second lookup regions, said first and second logical channel work addresses are independently mapped to any one of said eight channel work areas in said first and second channel work regions, said first and second logical channel addresses are independently mapped to any one of said eight channel areas in said first and second channel regions wherein said first and second register means comprises:

first and second map registers each having a plurality of bits, said first and second digital processors being operative to program said plurality of bits in said first and second map registers to a desired combination in order to access a particular one of said eight channel work areas in said first and second channel work regions and a particular one of said eight channel areas in said first and second channel regions, and, wherein said first map register further includes a mode bit and said second map register further includes a read only copy of said mode bit, said second mode being selected by said first digital processor by setting said mode bit to a second logic state and said second plurality of memory locations is equal to four times said first plurality of logically addressable memory locations.

4. The system according to claim 3, wherein said plurality of mapping bits in each of said first and second map registers includes:

a channel page select bit for selecting one of said first channel/first channel work regions and said second channel/second channel work regions, first and second channel select bits for selecting one of said four channel work areas and one of said four channel areas within a selected channel/channel work region, and a lookup select bit for selecting one of said first and second lookup regions.

5. The system according to claim 4, wherein said data storage means comprises 128K words of memory, said first and second memory pages having 64K words of memory each and, said first and second lookup regions each comprise 21.75K words of memory, said first and second channel work regions each comprise 8K words of memory and each of said eight channel work areas in said first and second channel work regions comprise 2K words of memory, and said first and second channel regions each comprise 32K words of memory and each of said eight channel areas in said first and second channel regions comprise 8K words of memory.

6. An addressable mode selectable digital information processing system comprising:

first and second digital processors each of which being operative to generate first and second logical addresses respectively for accessing a first plurality of memory locations, first and second register means for containing first and second address mapping/mode information coupled to said first and second digital processors, data storage means having a second plurality of memory locations each of which having a physical address, said second plurality being greater than said first plurality, first and second logical memory mapping means coupled to said first and second digital processors respectively and to said data storage means, said first and second logical memory mapping means being operative to receive (i) said first and second logical addresses from said first and second digital processors respectively and (ii) said first and second address mapping/mode information respectively and generate first and second physical addresses corresponding to a mode selected wherein said system is in a third mode, said first memory mapping means being operative to map said first logical addresses from said first digital processor directly to a first page of memory in said data storage means, said second memory mapping means being operative to map said second logical addresses from said second digital processor directly to a second page of memory in said data storage means such that said first and second processors can only access said first and second memory pages respectively and, wherein said first register means includes a first map register having a mode bit, said second register means includes a second map register having a read only copy of said mode bit, said third mode being selected by said first digital processor by setting said mode bit to a first logic state when said second plurality of memory locations is equal to two times said first plurality of logically addressable memory locations.

* * * * *